Patented Mar. 8, 1927.

1,619,964

UNITED STATES PATENT OFFICE.

JOSEPH F. ANDERSON, OF KANSAS CITY, KANSAS.

LUBRICATING OIL.

No Drawing. Application filed August 13, 1923. Serial No. 657,114.

My invention relates to improvements in lubricating oils.

One of the objects of my invention is to provide a novel lubricating oil, which is cheap to make, which has a maximum of efficiency, and which has great lasting qualities.

My improved lubricating oil is made by mixing a solution of rubber with ordinary lubricating oil, preferably a hydro-carbon oil having a paraffin base. The solution of rubber may comprise rubber dissolved in any rubber solvent, such as gasoline.

A convenient way in which to obtain the rubber in solution is to dissolve 1 gallon of ordinary rubber patching cement, as "Pará dry patching cement," an ordinary commercial article, in five gallons of gasoline. Mix this solution with substantially twenty-four gallons of a lubricating oil, such as a hydrocarbon oil having a paraffin base. The rubber patching cement may be the ordinary commercial rubber cement, commonly used for patching rubber tires, and may consist of raw rubber dissolved in bisulphid of carbon, or other suitable solvent.

The lubricating oil may be the usual lubricating oil derived from petroleum, such as is commonly sold at filling stations for crank case use.

To one gallon of the hydrocarbon lubricating oil add and mix thoroughly one fluid ounce of the mixture. The resultant product will have great lasting qualities and efficiency.

I do not limit my invention to the precise steps and proportions set forth above, as many modifications within the scope of the appended claim, may be made without departing from the spirit of my invention.

What I claim is:—

A lubricating oil consisting in a mixture of one gallon lubricating oil with substantially one fluid ounce of a mixture of substantially one ounce rubber cement, five ounces gasoline and substantially twenty-four ounces of lubricating oil.

In testimony whereof I have signed my name to this specification.

JOSEPH F. ANDERSON.